United States Patent [19]
Chapman et al.

[11] Patent Number: 5,671,340
[45] Date of Patent: Sep. 23, 1997

[54] METHOD OF NON-OVERLAPPING ADDITIVE COLOR PRINTING

[75] Inventors: Edward N. Chapman; Edward M. Housel, both of Rochester, N.Y.

[73] Assignee: Eastman Kodak Company, Rochester, N.Y.

[21] Appl. No.: 565,467

[22] Filed: Nov. 30, 1995

Related U.S. Application Data

[60] Provisional application No. 60/004,431 Sep. 28, 1995.

[51] Int. Cl.$^6$ .............. G06F 15/00; H04N 1/46; H04N 5/14; G03F 3/08
[52] U.S. Cl. .............. 395/101; 358/501; 358/515; 358/518; 395/109; 348/577
[58] Field of Search .................... 358/501, 504, 358/515, 518, 500; 395/101, 109; 348/577

[56] References Cited

U.S. PATENT DOCUMENTS

| | | | |
|---|---|---|---|
| 4,809,063 | 2/1989 | Moriguchi et al. | 358/75 |
| 4,893,177 | 1/1990 | Tada et al. | 358/515 |
| 4,959,790 | 9/1990 | Morsan | 364/518 |
| 4,974,067 | 11/1990 | Suzuki et al. | 358/75 |
| 5,010,814 | 4/1991 | Shishikura | 101/211 |
| 5,206,918 | 4/1993 | Levene | 382/110 |
| 5,416,612 | 5/1995 | Ingraham et al. | 358/501 |

*Primary Examiner*—Kim Vu
*Assistant Examiner*—Tia M. Harris
*Attorney, Agent, or Firm*—David M. Woods

[57] ABSTRACT

A multicolor printing method employing a color printer capable of printing non-overlapping red, green, blue and black colorants, includes the steps of: providing a digital color image having n-bit/color pixels; dividing the digital image into a plurality of pixel blocks; identifying pure red, green, blue, black and white pixels in each block and assigning such pixels to be printed with the corresponding colorant or white (no colorant); calculating percent red, green, blue, black and white for remaining pixels in each block; using the calculated percentages, assigning remaining pixels in each block to be printed with pure colorant or white according to a predetermined filling procedure; and printing the image using the assigned colorants.

15 Claims, 3 Drawing Sheets

1

METHOD OF NON-OVERLAPPING ADDITIVE COLOR PRINTING

CROSS REFERENCE TO RELATED APPLICATION

Reference is made to and priority claimed from U.S. Provisional application Ser. No. US 60/004,431, filed 28 Sep. 1995, entitled METHOD OF NON-OVERLAPPING ADDITIVE COLOR PRINTING.

The disclosure in the appendix contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The invention relates generally to printing systems for printing color documents, and, more specifically, to such printing systems having the capability of printing non-overlapping colors.

BACKGROUND OF THE INVENTION

Color marking engines capable of printing non-overlapping additive colorants (red, green, blue), such as the Kodak ImageSource 70 C/P electrophotographic color printer are known. Previously such color marking engines have not been used to print multicolor images such as photographs because the printers were not believed capable of producing commercially acceptable image quality. They were used as accent color printers which could produce only a limited number of colors.

Normally, color printers employ cyan, magenta, yellow and black to produce color prints. By overlaying these colorants, it is possible to make most colors. These printers are often called process color printers.

Accent color printers can place several colorants on the page. Since they cannot overlay colorants, they can only make colors which are shades of the available colorants plus white if the print receiving medium is white, or the underlying color of the print receiving medium if it is not white. Accent color printers are typically cheaper to manufacture than process color printers.

From the foregoing, it can be seen that it would be advantageous to have a method of extending the gamut of colors printable by an accent color printer, and in the event that the color printer is supplied with a set of three primary colorants, for printing most of the colors currently printable with process color printers.

SUMMARY OF THE INVENTION

The present invention is directed to overcoming one or more of the problems set forth above. Briefly summarized, according to one aspect of the present invention, a multi-color printing method employing a color printer capable of printing non-overlapping primary colorants and a black colorant includes the steps of: providing a digital color image having n-bit/color pixels; dividing the digital image into a plurality of pixel blocks; identifying pure primary colorant pixels and black and white pixels in each block and assigning such pixels to be printed with the corresponding colorant or white (no colorant); calculating percent primary colorant and black and white for remaining pixels in each block; using the calculated percentages, assigning the remaining pixels in each block to be printed with pure primary colorant and black or white according to a predetermined filling procedure; and printing the image using the assigned colorants.

The technical advantage of the invention is that more realistic colors can be obtained from an accent color printer than is presently the case. These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
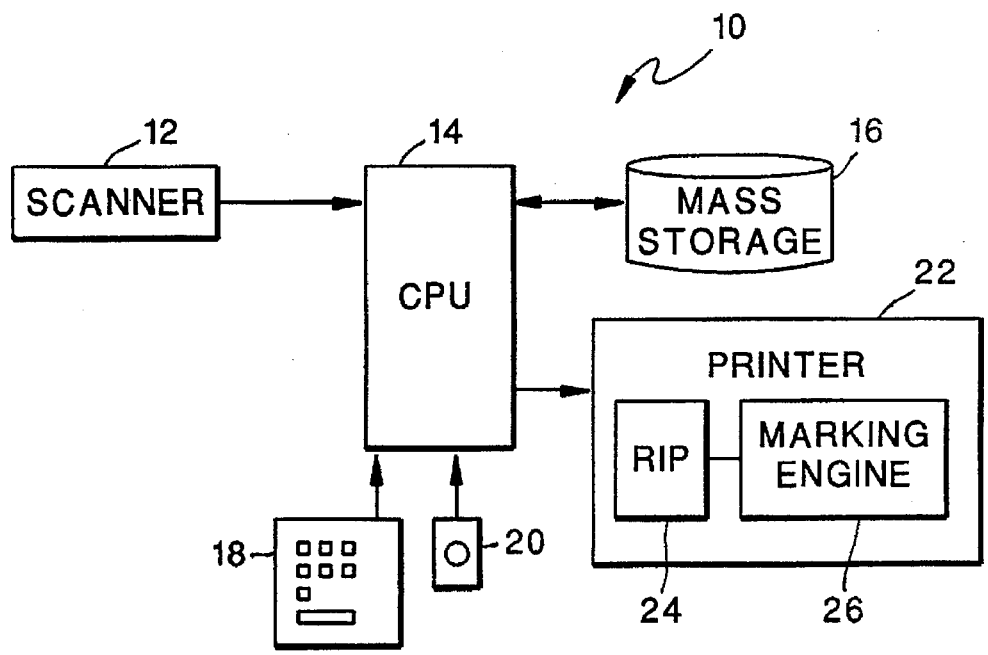
FIG. 1 is a block diagram of a printing system capable of employing the method of the present invention.

The invention is intended for the processing of primary colorants and black and white. Typical sets of primary colorants include red, green, and blue, or cyan, magenta, and yellow. Referring now to FIG. 1, a specific example of a system useful for practicing the method of the present invention with primary colorants red, green and blue is generally designated 10; the system is, for example, a system for printing documents having color images. The system includes a scanner 12 for scanning color photographic prints to produce a digital image file. The scanner 12 may be for example an Epson 800-C™ color scanner that produces 24 bit color digital image files from color photographic prints. The scanner 12 is connected to a central processing unit (CPU) 14, for example a Sun Microsystems Sparcstation 2™ workstation running a desktop publishing application such as Framemaker from Frame Technology on the Sun Solaris™ operating system. The system 10 includes a mass storage device 16, such as a magnetic disk drive for storing the data files generated by the desktop publishing application. Operator interface devices such as a keyboard 18 and mouse 20 are connected to the CPU 14 to allow an operator to control the system. A printer 22, such as a Kodak ImageSource 70 Copier/Printer, is connected to the CPU 14 for printing documents containing color images generated by the application. The printer 22 includes a programmable raster image processor (RIP) 24 connected to drive a color marking engine 26. The RIP 24 converts the page description language commands generated by the desktop publishing application to commands for driving the color marking engine 26. The color marking engine is provided with red, green, blue and black toners, and is capable of applying any one of the toners to a given pixel in the output image, but is not capable of overlapping the toners.

The page description language generated by the desktop publishing application defines each output pixel in terms of n-bit color components (e.g. 8-bits red, 8-bits green and 8-bits blue) in a page description language (e.g. PostScript or PCL). The RIP 24 interprets the page description language into rasterized 24-bit color components as is known in the prior art. The RIP 24 then converts the rasterized 24-bit color components to 3-bit additive color plus 1-bit black non-overlapping components (1-bit red, 1-bit green, 1-bit blue, and 1-bit black) for driving the color marking engine 26.

Figure 2:
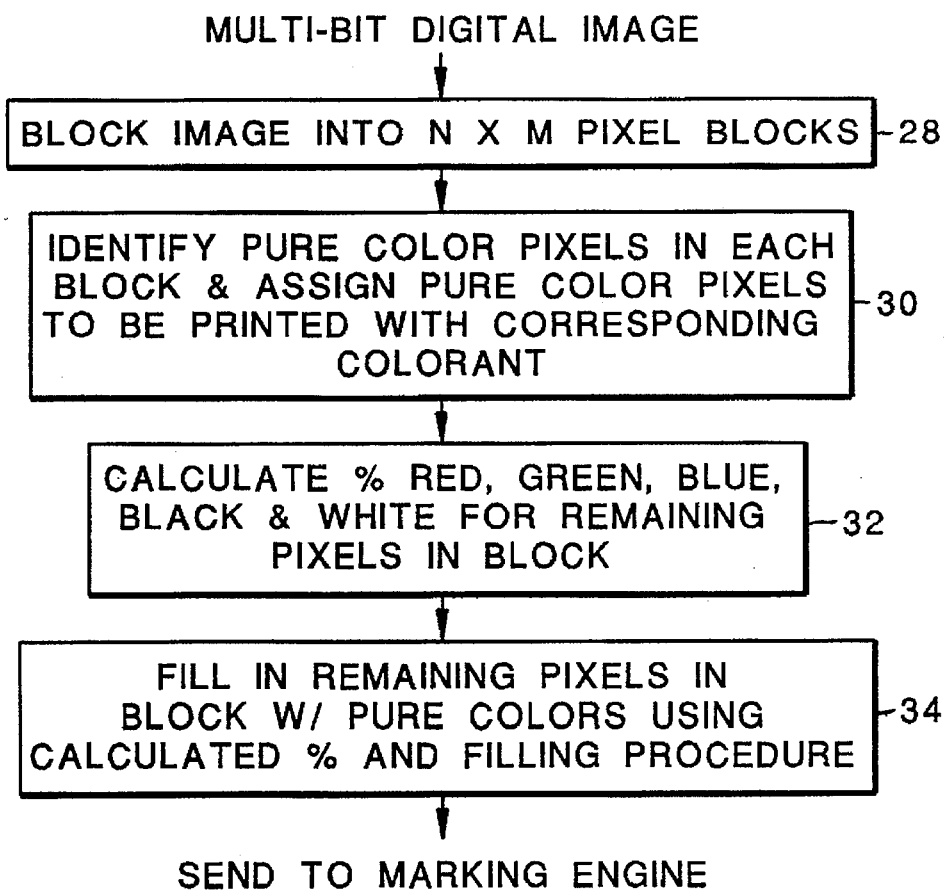
FIG. 2 is a flow chart illustrating the method of the present invention.

FIG. 2 is a flow chart illustrating the general method of the present invention that is performed in the RIP 24 of the printer. As shown in FIG. 2, a multi-bit digital image, generated for example by a PostScript interpreter running in the RIP 24, is first separated (28) into a plurality (n×m) of pixel blocks (e.g. 4×4 pixel blocks). In each n×m pixel block, pure color pixels (fully saturated red, green, blue, black or white) are identified and assigned to be printed (30) with the corresponding colorant (or lack thereof for white). An example of pure colors for eight bit per color per pixels is shown in Table 1, where the eight bit pixel values (0–255) for the pure colors white, black, red, green, and blue are shown.

TABLE 1

|       | RED | GREEN | BLUE |
|-------|-----|-------|------|
| Black | 0   | 0     | 0    |
| White | 255 | 255   | 255  |
| Red   | 255 | 0     | 0    |
| Green | 0   | 255   | 0    |
| Blue  | 0   | 0     | 255  |

For 1-bit per color images, each 255 value in Table 1 will be replaced with a 1.

Next, the percentage of red, green, blue, black and white color in the pixels (non-pure) remaining in the block are calculated (32). Then, the remaining pixels in the block are assigned a single printer colorant (or lack thereof) (34) using the calculated percentages and a filling procedure described in detail below. Finally, the single bit per pixel color commands are sent to the marking engine.

Figure 3:
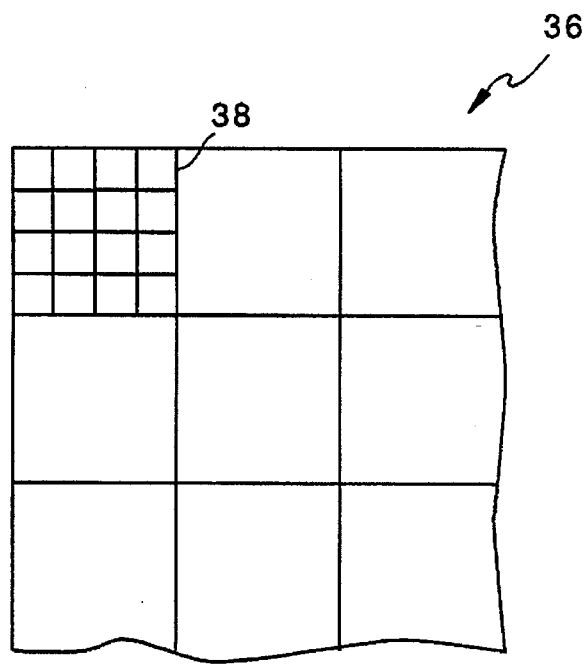
FIG. 3 is diagram useful in describing the step of forming blocks of pixels.
Figure 4:
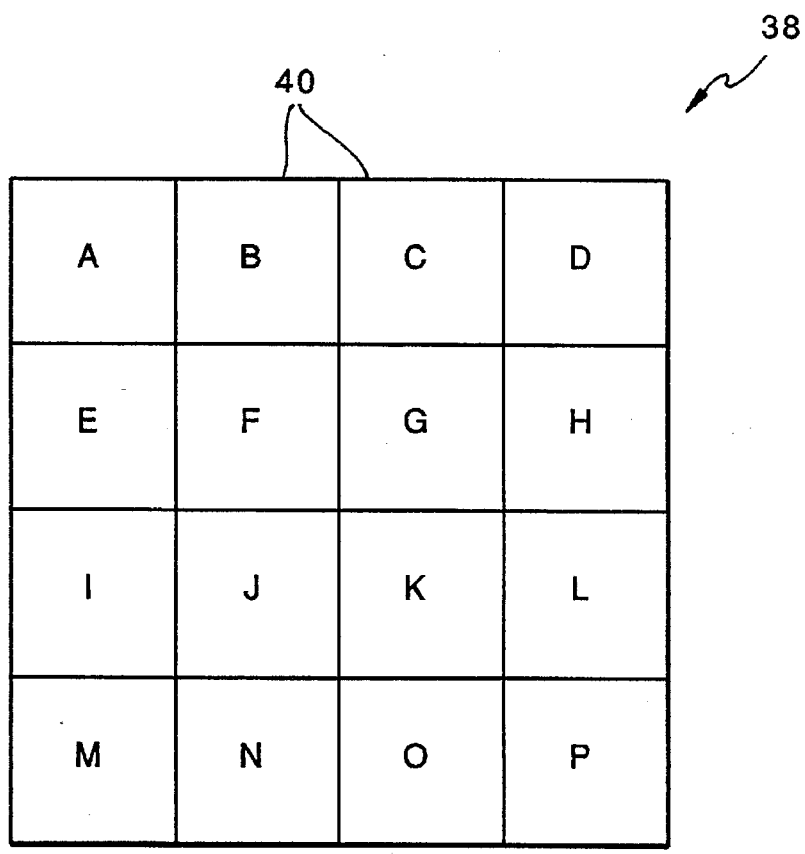
FIG. 4 is a diagram showing a block of pixels.

FIG. 3 illustrates a portion of an image 36 divided into 4×4 pixel blocks 38. Although 4×4 square blocks are shown for example, other shaped and sized blocks, such as 4×6 rectangular blocks or non-rectangular blocks may also be employed. If the whole image does not exactly map into n×m pixel blocks, the image may be surrounded with a white border to provide an exact number of n×m pixel blocks. FIG. 4 shows a 4×4 block of pixels in which each of the pixels 40 are lettered from a to p. The invention can be understood by considering an example, in which the R,G,B values of the pixels 40 in FIG. 4 are shown in Table 2.

TABLE 2

|   | RED | GREEN | BLUE |
|---|-----|-------|------|
| a | 0   | 0     | 0    |
| b | 100 | 120   | 80   |
| c | 110 | 125   | 85   |
| d | 115 | 130   | 90   |
| e | 0   | 0     | 0    |
| f | 255 | 255   | 255  |
| g | 255 | 255   | 255  |
| h | 255 | 0     | 0    |
| i | 255 | 0     | 0    |
| j | 0   | 255   | 0    |
| k | 0   | 255   | 0    |

TABLE 2-continued

|   | RED | GREEN | BLUE |
|---|-----|-------|------|
| l | 0   | 0     | 255  |
| m | 0   | 0     | 255  |
| n | 100 | 120   | 80   |
| o | 110 | 125   | 85   |
| p | 115 | 130   | 90   |

In this example, pixels a and e are pure black, pixels f and g are pure white, pixels h and i are pure red, pixels j and k are pure green, pixels l and m are pure blue and b, c, d, n, o and p are the six remaining pixels that are not pure color pixels. The percentage of Red, Green, Blue, White and Black for the remaining pixels is determined by first determining a representative pixel for the remaining pixels. The representative pixel may be calculated by adding the values for Red, Green and Blue respectively and dividing by the number of pixels as follows:

$$Red = \frac{100 + 100 + 110 + 110 + 115 + 115}{6} = 110;$$

$$Green = \frac{120 + 120 + 125 + 125 + 130 + 130}{6} = 125; \text{ and}$$

$$Blue = \frac{80 + 80 + 85 + 85 + 90 + 90}{6} = 85.$$

Alternatively, one of the remaining pixels in the block may be arbitrarily selected as the representative pixel. The first approach described above produces smoother appearing images. The alternative approach is faster and produces sharper appearing images.

The amounts of white and black in the representative pixel are calculated as follows:

Black=255−largest(red,green,blue);

White=smallest(red,green,blue).

The white component is then removed from the color components of the representative pixel by subtracting the white component from red, green and blue respectively as follows:

Red'=Red−White;

Green'=Green−White;

Blue'=Blue−White.

The percentage of red, green, blue, white and black are then calculated and normalized to 100% as follows:

sum = Red' + Green' + Blue' + White + Black;

$$Red \% = \frac{Red'}{sum};$$

$$Green \% = \frac{Green'}{sum};$$

$$Blue \% = \frac{Blue'}{sum};$$

$$White \% = \frac{White}{sum}; \text{ and}$$

$$Black \% = \frac{Black}{sum}.$$

The results for the example shown above will be Red %=9; Green %=15; Blue %=0; White %=30; and Black %=46. Next, a count of red, green, blue and black pixels is determined by multiplying the respective percentages times the number of remaining pixels in the n×m block. In the present example, the number of remaining pixels is 6, therefor the red count is 0, green count is 1, blue count is 0, white count is 2, and the black count is 3. Rounding, for this example, is weighted in favor of the higher fractional values such that the sum of the counts would equal the number of remaining pixels. These pixel counts are then distributed in the block according to a filling rule.

Figure 5:
FIG. 5 is a diagram useful in describing one procedure for assigning remaining pixels in a block.

FIG. 5 shows one possible filling rule, wherein the pixels are filled in the 4×4 block 38 in the numerical order shown, starting at the upper left hand corner of the block and spiraling into the center. The pure-colored pixels (i.e., the pixels that were filled with a pure color initially) occupy their original positions. The remaining pixels (i.e. the pixels that were not filled with a pure color initially) are filled in the order shown. If a pixel is already occupied and therefore filled, that pixel is skipped over (according to this filling rule) and the next unfilled pixel is filled. White is filled first starting from the pixel labeled "1", then pixel labelled "2" is filled, and so on. After all the remaining white pixels have been designated, red, green and blue pixels are filled in, and finally the black pixels are filled in, resulting in the white pixel count being located at the edge of the block and the black pixel count in the center, with the colored pixel count located in-between.

Figure 6:
FIG. 6 is a diagram useful in describing an alternate procedure for assigning remaining pixels in a block.

Alternatively, the pixels can be filled in an order that is preselected for a specific purpose, such as to minimize artifacts. For example, in FIG. 6 the order was preselected to minimize dot gain. In that example, the pure-colored pixels are located according to their original numerical designation. The remaining pixels are still filled (as described in connection with FIG. 5) white first, followed by red, green, blue and black pixels, according the same ascending numerical designation (i.e., pixel 1 first, then pixel 2, etc.), but the filling order is predetermined to move around the block. The effect is to have the same numerical designation of pixels as in FIG. 5, but to have the actual pixel locations jumbled in a preselected pattern.

The method of the present invention was employed to print a 24 bit Sun raster image on a 4 color electrophotographic accent color printer with acceptable image quality. The method was also employed to print a 1-bit per pixel raster color image outputted from a PostScript interpreter with acceptable image quality.

A listing of a computer program written in the C language running on a Sun work station for performing the method of the present invention is included as Appendix A.

The invention has been described with reference to a preferred embodiment. However, it will be appreciated that variations and modifications can be effected by a person of ordinary skill in the art without departing from the scope of the invention.

PARTS LIST 10 color document printing system
12 scanner
14 CPU
16 mass storage device
18 keyboard
20 mouse
22 printer
24 RIP
26 color marking engine
28 block image step
30 identify pure color pixels step
32 calculate percentage color in remaining pixels step
34 fill in remaining pixels step
36 image portion
38 block of pixels
40 pixels Sep 14 1995 14:29:03          AccentColorAlgorithm.c                    Page 17

```
1  /***************************   ***************************   *********************
2  *
3  *                  COPYRIGHT EASTMAN KODAK COMPANY, 1995
4  *                            ALL RIGHTS RESERVED
5  *
6  **********************************************************************************/
7  /**********************************************************************************
8  *
9  *    FILE NAME:      NewHalfTone.c
10 *
11 *    SCCS Release:   @(#)NewHalfTone.c   1.7
12 *    Newest Delta:   9/14/95     14:18:15
13 *
14 *    FUNCTION LIST:
15 *
16 *    GENERAL DESCRIPTION:
17 *        Convert a Sun raster input image of 32 bits and produce
18 *        a color half tone image out with no toner overlap.  Also works for
19 *        1 bit / pixel / color images converted to Sun 32 bit raster format
20 *
21 *    REVISION HISTORY:
22 *
23 *    DATE         AUTHOR        FUNCTIONS/DATA MODIFIED
24 *    ====         ======        =======================
25 *    09/14/95     Ed Chapman    White/Black names switched - no functionality change
26 *    08/23/95     Ed Chapman    fix bug with bottom white border
27 *    08/17/95     Ed Chapman    add white border on edges so all cells are full size
28 *    08/09/95     Ed Chapman    replace #define's with command line arguments
29 *    08/08/95     Ed Chapman    normalize colors linearly, clean up
30 *    07/25/95     Ed Chapman    option of interlocking puzzle pieces instead of
31 *                               rectangular cells
32 *    07/19/95     Ed Chapman    New version with spiral spot function/ 4x4 cells
33 *    03/11/95     Ed Chapman    original ColorHalfTone.c with spiral spot function
34 *
35 *            ADD HISTORY TO TOP
36 *
37 **********************************************************************************/
38
39 /** INCLUDE FILES **/
40 #include <stdio.h>
41 #include <sys/file.h>
42 #include <sys/types.h>
43 #include <pixrect/pixrect_hs.h>
44 #include "ImageEd.h"
45
46 /** DEFINES **/
47 #define PRINTF        0    /* turn on debug if 1 */
48
49      /*
50          The interlocking "puzzle" pieces look like this:
51
52              _       _
53           _ | |_| | _ | |_| |
54          | |_| |_| | | |_| |_| |
55          |_| |_|_|_| |_| |_|_|_|
56              |_|         |_|
57              _           _
58           _ | |_| | _ | |_| |
59          | |_| |_| | | |_| |_| |
60          |_| |_|_|_| |_| |_|_|_|
61              |_|         |_|
62
63       */
64
65 #define MarkHalftone     0
66 #define MarkRed          1
```

```
 67 #define MarkGreen          2
 68 #define MarkBlue           3
 69 #define MarkWhite          4
 70 #define MarkBlack          5
 71
 72     /* offsets in 32 bit word for color pixels in sun 32 bit raster file  */
 73 #define RO                 3
 74 #define GO                 2
 75 #define BO                 1
 76
 77 /** TYPEDEFS **/
 78
 79 /** MACRO DEFINITIONS **/
 80
 81 /** EXTERN FUNCTION DECLARATIONS **/
 82
 83 /** EXTERN DATA DECLARATIONS **/
 84
 85 /** GLOBAL FUNCTION DECLARATIONS **/
 86
 87 /** GLOBAL DATA DEFINITIONS **/
 88
 89 /** LOCAL FUNCTION DECLARATIONS **/
 90 void    FindSpotPercentage();
 91 void    BuildColorSpots();
 92 void    GetSpotOrder();
 93
 94 /** LOCAL DATA DEFINITIONS **/
 95 u_int   SpotOrder[MAX_CELL_X * MAX_CELL_Y];
 96
 97 main    (argc, argv)
 98 int     argc;
 99 char    *argv[];
100 {
101     int     ifd;
102     int     ifd2;
103     int     ofd;
104     int     i;
105     int     j;
106     int     x;
107     int     a;
108     int     b;
109     int     CellRectSize;
110     int     PixelsPerCell;
111     int     CellsPerLoop;
112     int     NextCelldst;
113     int     size;
114     int     TopBorder;
115     int     BottomBorder;
116     int     LeftBorder;
117     int     RightBorder;
118     int     PsuedoWidth;
119     int     PsuedoHeight;
120     int     loop;
121     struct  rasterfile header;
122     struct  rasterfile header2;
123     char    Shawdow[MAX_CELL_X * MAX_CELL_Y];
124     int     XCellSize = 4;      /* default value can change on command line  */
125     int     YCellSize = 4;      /* default value can change on command line  */
126     int     r_accum;
127     int     g_accum;
128     int     b_accum;
129     int     accum;
130     int     IsPiece2 = 0;       /* start with first shape of puzzle pieces   */
131     int     UseRectangle = 1;   /* default value can change on command line  */
132     int     UseAverage = 0;     /* default value can change on command line  */
```

Sep 14 1995 14:29:03      AccentColorAlgorithm.c      Page/3

```
133     int     itr;
134     int     lines;
135
136     u_char  *src;
137     u_char  *srccpy;
138     u_char  *dst;
139     u_char  *dstcpy;
140     u_char  *sbuffer;
141     u_char  *dbuffer;
142     char    *tmp;
143     PSpot   pst;
144     char    FileName[1024];
145     char    OrigFileName[1024];
146
147     char    *arg;
148     char    argName;
149     int     value = -1;
150
151     if(argc <2)
152     {
153         printf("synopsis: NewHalfTone [help -m M -c C -x X -y Y -f input_filename]\r
154         exit(1);
155     }
156
157     while (--argc > 0)
158     {
159         arg = *++argv;
160
161         if (!strcmp(arg, "help"))
162         {
163             printf("NewHalfTone ver 1.01: Arguments are:\n");
164             printf("  -m int -- method: 0 = interpolation, 1 = average (default = %c
165             printf("  -c int -- cell type: 0 = interlocking puzzle, ");
166             printf("1 = x by y rectangle (default = %d)\n", UseRectangle);
167             printf("  -x int -- X Cell Size for rectangle cell: (default = %d)\n", )
168             printf("  -y int -- Y Cell Size for rectangle cell: (default = %d)\n", )
169             printf("  -f filename\n");
170             exit(1);
171         }
172
173         if (*arg == '-')
174             argName = *++arg;
175
176         if (--argc == 0)
177         {
178             printf("Error: Missing value for -%c.\n", argName);
179             exit (1);
180         }
181
182         if(argName != 'f')   /* is an integer */
183         {
184             sscanf (*++argv, "%d", &value);
185
186             if (value < 0)
187             {
188                 printf("Error: -%c value must be >= 0 (was %d)\n",
189                 argName, value);
190                 exit (1);
191             }
192         }                                                         \
193
194         switch (argName)
195         {
196         case 'm':
197             UseAverage = value;
198             break;
```

/home/jade_smart/usr2/emh

Sep 14 1995 14:29:03          AccentColorAlgorithm.c                Page/4

```c
            case 'c':
                UseRectangle = value;
                break;

case 'x':
                XCellSize = value;
                break;

case 'y':
                YCellSize = value;
                break;

case 'f':
                strcpy(OrigFileName, *++argv);
                break;

default:
                printf("Error: Invalid argument -%c\n", argName);
                exit (1);
            }

}   /  end while (--argc > 0)  / if(UseRectangle)
    {
        printf("rectangle cells, ");
        PixelsPerCell = XCellSize * YCellSize;
        itr = 1;
    }
    else
    {
        printf("interlocking cells, ");
        itr = 2;
        XCellSize = 5;
        YCellSize = 5;
    } printf("X and Y Cell Size = (%d %d), ",XCellSize, YCellSize);

if (UseAverage)
        printf("averaging pixels\n");
    else
        printf("interpolate pixels\n");

pst = (PSpot)malloc(sizeof(Spot));

if(!pst)
    {
        printf("malloc error\n");
        exit(1);
    }

/*  loop once for rectangles twice for puzzles   */
    while(itr--)
    {
        strcpy(FileName, OrigFileName);

if(!UseRectangle)
            if(IsPiece2)
            {
                printf("part 2...\n");
                PixelsPerCell = 12;
            }
            else
            {
```

Sep 14 1995 14:29:03    part    AccentColorAlgorithm.c                    Page 5

```
265             printf("P_   1...\n");
266             PixelsPerCell = 13;
267         }
268
269     ifd = open(FileName, O_RDONLY);
270
271     if(ifd < 0)
272     {
273         printf("Error opening Input File: %s\n", FileName);
274         exit(1);
275     }
276
277     read(ifd, (char *)&header, sizeof(struct rasterfile));
278
279     if(header.ras_magic != RAS_MAGIC)
280     {
281         printf("Not in Sun Raster format\n");
282         exit(1);
283     }
284
285     if(header.ras_depth != 32)
286     {
287         printf("Not in 32 bits per pixel\n");
288         exit(1);
289     }
290
291     if(!(header.ras_type == RT_STANDARD))
292     {
293         printf("Not in Supported Sun Raster Type\n");
294         exit(1);
295     }
296
297     if(header.ras_maplength != 0)
298     {
299         tmp = (char *)malloc(header.ras_maplength);
300
301         if(!tmp)
302         {
303             printf("malloc error on color map\n");
304             exit(1);
305         }
306
307         read(ifd, tmp, header.ras_maplength);
308         free(tmp);
309     }
310
311     /*  PsuedoWidth, PsuedoHeight are the width and height with a white
312         border around the input images.  The borders ensure the half
313         tone cells are always full size.  The borders are not written
314         to the output images
315     */
316     PsuedoWidth = header.ras_width;
317     PsuedoHeight = header.ras_height;
318
319     if(IsPiece2)
320     {
321         LeftBorder = 2;
322         TopBorder = 2;
323     }
324     else
325     {
326         LeftBorder = 0;
327         TopBorder = 0;
328     }
329
330     PsuedoWidth += LeftBorder;
```

/home/jade_smart/usr2/emh

```
            PsuedoHeight += P    rder; TopBorder;

if(PsuedoWidth % XCellSize)
                RightBorder = XCellSize - (PsuedoWidth % XCellSize);
            else
                RightBorder = 0;

PsuedoWidth += RightBorder;

if(PsuedoHeight % YCellSize)
                BottomBorder = YCellSize - (PsuedoHeight % YCellSize);
            else
                BottomBorder = 0;

PsuedoHeight += BottomBorder;

/* num of bytes total for YCellSize lines of rgb     */
            size = PsuedoWidth * YCellSize * 4;

sbuffer = (u_char *)malloc(size);

if(!sbuffer)
            {
                printf("malloc error\n");
                exit(1);
            } if(IsPiece2)
            {
                strcat(FileName, ".new");

ifd2 = open(FileName, O_RDONLY);

if(ifd2 < 0)
                {
                    printf("Error opening Input File: %s\n", FileName);
                    exit(1);
                } read(ifd2, (char *)&header2, sizeof(struct rasterfile));

if(header2.ras_maplength != 0)
                {
                    tmp = (char *)malloc(header.ras_maplength);

if(!tmp)
                    {
                        printf("malloc error on color map\n");
                        exit(1);
                    } read(ifd, tmp, header.ras_maplength);
                    free(tmp);
                }
            } strcat(FileName, ".new");

printf("Creating output file: %s\n", FileName);

ofd = open(FileName, O_RDWR|O_CREAT,0644);

if(ofd < 0)
            {
                printf("Error opening file %s\n", FileName);
                exit(1);
```

```
397             }
398
399             CellRectSize = YCellSize * XCellSize;
400
401                     /* times to get "size" bytes of data for entire image   */
402             CellsPerLoop = size / (CellRectSize * 4);
403             loop = PsuedoHeight / YCellSize;
404
405                     /* num of bytes to get to next cell assuming 32 bit images in dst   */
406             NextCelldst = 4 * XCellSize;
407
408             write (ofd, &header, sizeof (struct rasterfile));
409
410             dbuffer = (u_char *)malloc(size);
411
412             if(!dbuffer)
413             {
414                 printf("malloc error\n");
415                 exit(1);
416             }
417 #if PRINTF
418             printf("TopBorder = %d BottomBorder = %d\n", TopBorder, BottomBorder);
419             printf("LeftBorder = %d RightBorder = %d\n", LeftBorder, RightBorder);
420             printf("PsuedoWidth= %d PsuedoHeight = %d\n", PsuedoWidth, PsuedoHeight);
421             printf("Width= %d Height = %d\n", header.ras_width, header.ras_height);
422 #endif
423
424             GetSpotOrder(   XCellSize,
425                             YCellSize,
426                             PsuedoWidth,
427                             SpotOrder,
428                             PixelsPerCell);
429
430 #if PRINTF
431             for(i=0; i<PixelsPerCell; i++)
432                 printf("i = %d =order= %d\n", i, *(SpotOrder + i));
433             fflush(stdout);
434 #endif
435
436             for(i=0; i<loop; i++)
437             {
438                 dst = dbuffer;
439                 src = sbuffer;
440                 srccpy = sbuffer;
441                 dstcpy = dbuffer;
442
443                     /* create a white border on top of the image so the shapes
444                         along the top are the standard pieces. TopBorder will be
445                         set to zero after one loop so this executes once at the most
446                     */
447                 for(a=0; a<PsuedoWidth*TopBorder; a++)
448                 {
449                     *(srccpy + RO) = 0xff;
450                     *(srccpy + GO) = 0xff;
451                     *(srccpy + BO) = 0xff;
452                     srccpy += 4;
453
454                     if( IsPiece2)
455                     {
456                         *(dstcpy + RO) = 0xff;
457                         *(dstcpy + GO) = 0xff;
458                         *(dstcpy + BO) = 0xff;
459                         dstcpy += 4;
460                     }
461                 }
462
```

```
            if(i == (loop - 1))
                lines = YCellSize - BottomBorder;
            else if (TopBorder)
                lines = YCellSize - TopBorder;
            else
                lines = YCellSize;

for(a=0; a<lines; a++)
            {
                for(b=0; b<LeftBorder; b++)
                {
                    /*  create a white border on the left side of the image so the
                        shapes along the left edge are the standard puzzle pieces
                    */
                    *(srccpy + RO) = 0xff;
                    *(srccpy + GO) = 0xff;
                    *(srccpy + BO) = 0xff;
                    srccpy += 4;

if( IsPiece2)
                    {
                        *(dstcpy + RO) = 0xff;
                        *(dstcpy + GO) = 0xff;
                        *(dstcpy + BO) = 0xff;
                        dstcpy += 4;
                    }
                } read(ifd, srccpy, header.ras_width*4);
                srccpy += header.ras_width*4;

/*  read the first type of puzzle piece into a buffer    */
                if( IsPiece2)
                {
                    read(ifd2, dstcpy, header.ras_width*4);
                    dstcpy += header.ras_width*4;
                } for(b=0; b<RightBorder; b++)
                {
                    /*  create a white border on the right side of the image    */

*(srccpy + RO) = 0xff;
                    *(srccpy + GO) = 0xff;
                    *(srccpy + BO) = 0xff;
                    srccpy += 4;

if( IsPiece2)
                    {
                        *(dstcpy + RO) = 0xff;
                        *(dstcpy + GO) = 0xff;
                        *(dstcpy + BO) = 0xff;
                        dstcpy += 4;
                    }
                }

} /** end for(a=0; a<lines; a++)  **/

/*  create a white border on the bottom of the image    */
            if(i == (loop - 1))
            {
                for(a=0; a<PsuedoWidth*BottomBorder; a++)
                {
                    *(srccpy + RO) = 0xff;
                    *(srccpy + GO) = 0xff;
                    *(srccpy + BO) = 0xff;
```

```
                    srccpy += 4;

if( IsPiece2)
                    {
                        *(dstcpy + RO) = 0xff;
                        *(dstcpy + GO) = 0xff;
                        *(dstcpy + BO) = 0xff;
                        dstcpy += 4;
                    }
                }
        } srccpy = sbuffer;
        dstcpy = dbuffer;

for(j=0; j<CellsPerLoop; j++)
        {
                /* only support XRGB for now *src = X,  *(src+1) = R ...    */

/* check for pure RGBKW for each input pixel and mark output
                   pixel if so (use shadow buffer)
                */ r_accum = 0;
            g_accum = 0;
            b_accum = 0;
            accum = 0;

for(x=0; x<PixelsPerCell; x++)
            {
                if((*(src + SpotOrder[x] + RO) < 255) && *(src + SpotOrder[x] +
                || (*(src + SpotOrder[x] + GO) < 255) && *(src + SpotOrder[x] +
                || (*(src + SpotOrder[x] + BO) < 255) && *(src + SpotOrder[x] +
                {
                        /* not RGBWK   */
                    Shawdow[x] = MarkHalftone;
                    if (UseAverage)
                    {
                        r_accum += *(src + SpotOrder[x] + RO);
                        g_accum += *(src + SpotOrder[x] + GO);
                        b_accum += *(src + SpotOrder[x] + BO);
                    }
                    else
                    {
                        r_accum = *(src + SpotOrder[x] + RO);
                        g_accum = *(src + SpotOrder[x] + GO);
                        b_accum = *(src + SpotOrder[x] + BO);
                    } accum++;
                } else if(( *(src + SpotOrder[x] + RO) == 255)
                     && ( *(src + SpotOrder[x] + GO) == 255)
                     && ( *(src + SpotOrder[x] + BO) == 255))
                {
                    /* White    */
                    Shawdow[x] = MarkWhite;
                } else if(( *(src + SpotOrder[x] + RO) == 0)
                     && ( *(src + SpotOrder[x] + GO) == 0)
                     && ( *(src + SpotOrder[x] + BO) == 0))
                {
                    /* Black    */
```

```
            low[x] = MarkBlack;
    } else if(( *(src + SpotOrder[x] + RO) == 255)
                && ( *(src + SpotOrder[x] + GO) == 0)
                && ( *(src + SpotOrder[x] + BO) == 0))
            {
                Shawdow[x] = MarkRed;
            } else if(( *(src + SpotOrder[x] + RO) == 0)
                && ( *(src + SpotOrder[x] + GO) == 255)
                && ( *(src + SpotOrder[x] + BO) == 0))
            {
                /* Green      */
                Shawdow[x] = MarkGreen;
            } else if(( *(src + SpotOrder[x] + RO) == 0)
                && ( *(src + SpotOrder[x] + GO) == 0)
                && ( *(src + SpotOrder[x] + BO) == 255))
            {
                /* Blue */
                Shawdow[x] = MarkBlue;
            } else
            {
                /* not RGBWK    */
                Shawdow[x] = MarkHalftone;

if  (UseAverage)
                {
                    r_accum += *(src + SpotOrder[x] + RO);
                    g_accum += *(src + SpotOrder[x] + GO);
                    b_accum += *(src + SpotOrder[x] + BO);
                }
                else
                {
                    r_accum = *(src + SpotOrder[x] + RO);
                    g_accum = *(src + SpotOrder[x] + GO);
                    b_accum = *(src + SpotOrder[x] + BO);
                }
                accum++;
            }

} / end for(x=0; x<PixelsPerCell; x++)   / src += NextCelldst;

/*  find the average of the remaining pixels   */ if (UseAverage)
            if(accum)
            {
                r_accum /= accum;
                g_accum /= accum;
                b_accum /= accum;
            }

FindSpotPercentage( r_accum,
                            g_accum,
                            b_accum,
                            pst);
#if PRINTF
```
/home/jade_smart/usr2/emh

```
Sep 14 1995 14:29:03          AccentColorAlgorithm.c                  Page 11
661                  printf("RAve = %d GAve = %d BAve = %d  Ne1   e = %d  R = %d G = %d B
662                          r_accum,                      Non Pure
663                          g_accum,
664                          b_accum,
665                          accum,
666                          pst->r, pst->g, pst->b, pst->k, pst->w);
667                  fflush(stdout);
668 #endif
669
670                  BuildColorSpots(pst, dst, PixelsPerCell, accum, Shawdow);
671
672                  dst += NextCelldst;
673
674          }   /**  end for(j=0; j<CellsPerLoop; j++)  **/
675
676              /*  write the output image while stripping off the white borders
677                  making the output image the same size as the input image
678              */
679
680              /*  skip past the top border    */
681          dstcpy += PsuedoWidth * TopBorder * 4;
682
683          for(a=0; a<lines; a++)
684          {
685                  /*  skip left border pixels times 4 colors  */
686              dstcpy += LeftBorder * 4;
687
688              write(ofd, dstcpy, header.ras_width * 4);
689              dstcpy += header.ras_width * 4;
690
691                  /*  skip right border pixels times 4 colors */
692              dstcpy += RightBorder * 4;
693          }
694
695          TopBorder = 0;      /*  only use this once  */
696
697       }  /**  end for(i=0; i<loop; i++)  **/
698
699       free(sbuffer);
700       free(dbuffer);
701
702       close(ifd);
703
704       if( IsPiece2)
705           close(ifd2);
706
707       close(ofd);
708
709       IsPiece2 = 1;
710    }
711
712    free(pst);
713 }
714
715    /*  returns percentage of spots * 255 for r, g, b, w, k */
716 void    FindSpotPercentage(rp, gp, bp, pspot)
717 int     rp;
718 int     gp;
719 int     bp;
720 PSpot   pspot;
721 {
722     int     sum;
723
724     if((rp > gp) && (rp > bp))
725         pspot->k = 255 - rp;
726     else if(gp > bp)
```
/home/jade_smart/usr2/emh

```
            pspot->k = 255 - gp;
        else
            pspot->k = 255 - bp;

if((rp < gp) && (rp < bp))
            pspot->w = rp;
        else if(gp < bp)
            pspot->w = gp;
        else
            pspot->w = bp;

/* remove the white component   */
        pspot->r = rp - pspot->w;
        pspot->g = gp - pspot->w;
        pspot->b = bp - pspot->w;

sum = pspot->r + pspot->g + pspot->b + pspot->w + pspot->k;

if(sum)
        {
                /* normalize    */
            pspot->r = (pspot->r * 255)/sum;
            pspot->g = (pspot->g * 255)/sum;
            pspot->b = (pspot->b * 255)/sum;
            pspot->k = (pspot->k * 255)/sum;
            pspot->w = (pspot->w * 255)/sum;
        }

/*  right now we still have a rounding error which is accounted
            for in BuildColorSpots()   */
} void    BuildColorSpots(pspot, buf, OrigCellSize, RemainingCellSize, shadow)
PSpot   pspot;
u_char  *buf;
int     OrigCellSize;
int     RemainingCellSize;
char    *shadow;
{
    int     i;
    int     rc;
    int     gc;
    int     bc;
    int     kc;
    int     wc;
    int     *tmp;

/* convert percentages to a count we can use   */
    rc = (pspot->r*RemainingCellSize)/255;
    gc = (pspot->g*RemainingCellSize)/255;
    bc = (pspot->b*RemainingCellSize)/255;
    kc = (pspot->k*RemainingCellSize)/255;
    wc = (pspot->w*RemainingCellSize)/255;

/* make sure we didn't lose a pixel    */
        /* using the highest mod number would be better */
    while ((rc + gc + bc + wc + kc) < RemainingCellSize)
    {
        if(rc > gc)
            tmp = (int *)&rc;
        else
            tmp = (int *)&gc;

if(bc > *tmp)
            tmp = (int *)&bc;
```

Sep 14 1995 14:29:03              AccentColorAlgorithm.c                    Page 13

```
793         if(wc > *tmp)
794             tmp = (int *)&wc;
795
796         if(kc > *tmp)
797             tmp = (int *)&kc;
798
799         *tmp += 1;
800
801     } /** end while ((rc + gc + bc + wc + kc) < RemainingCellSize)  **/
802
803 #if PRINTF
804     printf("rc = %d gc = %d bc = %d wc = %d kc = %d\n",rc,gc,bc,wc,kc);
805     fflush(stdout);
806 #endif
807
808     for(i=0; i< OrigCellSize; i++)
809     {
810         switch(shadow[i])
811         {
812         case MarkBlack:
813             *(buf + SpotOrder[i] + RO) = 0;
814             *(buf + SpotOrder[i] + GO) = 0;
815             *(buf + SpotOrder[i] + BO) = 0;
816             break;
817
818         case MarkWhite:
819             *(buf + SpotOrder[i] + RO) = 255;
820             *(buf + SpotOrder[i] + GO) = 255;
821             *(buf + SpotOrder[i] + BO) = 255;
822             break;
823
824         case MarkRed:
825             *(buf + SpotOrder[i] + RO) = 255;
826             *(buf + SpotOrder[i] + GO) = 0;
827             *(buf + SpotOrder[i] + BO) = 0;
828             break;
829
830         case MarkGreen:
831             *(buf + SpotOrder[i] + RO) = 0;
832             *(buf + SpotOrder[i] + GO) = 255;
833             *(buf + SpotOrder[i] + BO) = 0;
834             break;
835
836         case MarkBlue:
837             *(buf + SpotOrder[i] + RO) = 0;
838             *(buf + SpotOrder[i] + GO) = 0;
839             *(buf + SpotOrder[i] + BO) = 255;
840             break;
841
842         default:
843             break;
844
845         } /** end switch(shadow[i])  **/
846
847     } /** end for(i=0; i< OrigCellSize; i++)  **/
848
849     /* Build white spots   */
850
851     for(i=0; i< wc; i++)
852     {
853         if(!(shadow[i]))
854         {
855             *(buf + SpotOrder[i] + RO) = WHITE;
856             *(buf + SpotOrder[i] + GO) = WHITE;
857             *(buf + SpotOrder[i] + BO) = WHITE;
858         }
```

/home/jade_smart/usr2/emh

```
859              else
860                  wc++;
861      }
862
863          /*  memory isn't cleared first so we have to build black    */
864
865          /*  Build black spots   */
866      for(i=0; i< kc; i++)
867      {
868          if((OrigCellSize - i) > 0)
869          {
870              if(!(shadow[OrigCellSize - i - 1]))
871              {
872                  *(buf + (SpotOrder[OrigCellSize - i - 1]) + RO) = 0;
873                  *(buf + (SpotOrder[OrigCellSize - i - 1]) + GO) = 0;
874                  *(buf + (SpotOrder[OrigCellSize - i - 1]) + BO) = 0;
875              }
876              else
877                  kc++;
878          }
879          else
880              i = kc;
881      }
882
883          /*  Build color spots   */
884      for(i=wc; i< (OrigCellSize - kc); i++)
885      {
886          if(!(shadow[i]))
887          {
888
889              if(rc)
890              {
891                  {
892                      *(buf + SpotOrder[i] + RO) = 255;
893                      *(buf + SpotOrder[i] + GO) = 0;
894                      *(buf + SpotOrder[i] + BO) = 0;
895                      rc--;
896                  }
897              }
898
899              else if (gc)
900              {
901                  *(buf + SpotOrder[i] + RO) = 0;
902                  *(buf + SpotOrder[i] + GO) = 255;
903                  *(buf + SpotOrder[i] + BO) = 0;
904                  gc--;
905              }
906
907              else
908              {
909                  *(buf + SpotOrder[i] + RO) = 0;
910                  *(buf + SpotOrder[i] + GO) = 0;
911                  *(buf + SpotOrder[i] + BO) = 255;
912              }
913
914          }   /**  end if(!(shadow[i]))  **/
915
916      }   /**  end for(i=wc; i< (RemainingCellSize - kc); i++)  **/
917
918  }
919
920  void    GetSpotOrder(XCellSize, YCellSize, XLineSize, buf, NumPixels)
921  int     XCellSize;
922  int     YCellSize;
923  int     XLineSize;
924  u_int   *buf;
```

Sep 14 1995 14:29:03          AccentColorAlgorithm.c                    Page 25

```
int     NumPixels;
{
    u_int   *bufcp;
    int     j;
    int     spiral = 0;
    int     offset = 0;

bufcp = buf;

if(NumPixels == XCellSize*YCellSize)
    {
        /*  is a rectangle  */ while((bufcp - buf) < (XCellSize * YCellSize))
        {
            if((XCellSize-spiral) > 0)
            {
                for(j=0; j<(XCellSize-spiral); j++)
                {
                    *bufcp++ = offset;
                    offset += 4;
                }
                offset -= 4;
            }
            else
                spiral = MAX_CELL_X;

spiral++;

if((YCellSize-spiral) > 0)
                for(j=0; j<(YCellSize-spiral); j++)
                {
                    offset += XLineSize*4;
                    *bufcp++ = offset;
                }
            else
                spiral = MAX_CELL_X;

if((XCellSize-spiral) > 0)
            {
                for(j=0; j<(XCellSize-spiral); j++)
                {
                    offset -= 4;
                    *bufcp++ = offset;
                } spiral++;
            }
            else
                spiral = MAX_CELL_X;

if((YCellSize-spiral) > 0)
            {
                for(j=0; j<(YCellSize-spiral); j++)
                {
                    offset -= XLineSize*4;
                    *bufcp++ = offset;
                } offset += 4;
            }
            else
                spiral = MAX_CELL_X;
        }
    }
```

/home/jade_smart/usr2/emh

```
         /* this is puzzle piece number 1 using the spiral */
    else if(NumPixels == 13)
    {
        *bufcp++ = (0*XLineSize + 2)*4;
        *bufcp++ = (1*XLineSize + 3)*4;
        *bufcp++ = (2*XLineSize + 4)*4;
        *bufcp++ = (3*XLineSize + 3)*4;
        *bufcp++ = (4*XLineSize + 2)*4;
        *bufcp++ = (3*XLineSize + 1)*4;
        *bufcp++ = (2*XLineSize + 0)*4;
        *bufcp++ = (1*XLineSize + 1)*4;
        *bufcp++ = (1*XLineSize + 2)*4;
        *bufcp++ = (2*XLineSize + 3)*4;
        *bufcp++ = (3*XLineSize + 2)*4;
        *bufcp++ = (2*XLineSize + 1)*4;
        *bufcp++ = (2*XLineSize + 2)*4;
    }

/* this is puzzle piece number 2 using the spiral */
    else if(NumPixels == 12)
    {
        *bufcp++ = (0*XLineSize + 1)*4;
        *bufcp++ = (0*XLineSize + 2)*4;
        *bufcp++ = (1*XLineSize + 3)*4;
        *bufcp++ = (2*XLineSize + 3)*4;
        *bufcp++ = (3*XLineSize + 2)*4;
        *bufcp++ = (3*XLineSize + 1)*4;
        *bufcp++ = (2*XLineSize + 0)*4;
        *bufcp++ = (1*XLineSize + 0)*4;
        *bufcp++ = (1*XLineSize + 1)*4;
        *bufcp++ = (1*XLineSize + 2)*4;
        *bufcp++ = (2*XLineSize + 2)*4;
        *bufcp++ = (2*XLineSize + 1)*4;
    } else
    {
        printf("must have rectangle or fixed pattern\n");
        exit(1);
    }

/*
        here is what a 4x4 spiral hard coded looks like

*(buf + 0) = 0;
    *(buf + 1) = 4;
    *(buf + 2) = 8;
    *(buf + 3) = 12;
    *(buf + 4) = 1548;
    *(buf + 5) = 3084;
    *(buf + 6) = 4620;
    *(buf + 7) = 4616;
    *(buf + 8) = 4612;
    *(buf + 9) = 4608;
    *(buf + 10) = 3072;
    *(buf + 11) = 1536;
    *(buf + 12) = 1540;
    *(buf + 13) = 1544;
    *(buf + 14) = 3080;
    *(buf + 15) = 3076;
*/

/* here is what a 4x4 "random" or hand-picked looks like   */
/*
    *(buf + 0) = 4620;
    *(buf + 1) = 1548;
```

```
1057        *(buf + 2)  = 3080;
1058        *(buf + 3)  = 4;
1059        *(buf + 4)  = 4616;
1060        *(buf + 5)  = 4608;
1061        *(buf + 6)  = 1540;
1062        *(buf + 7)  = 12;
1063        *(buf + 8)  = 3072;
1064        *(buf + 9)  = 3084;
1065        *(buf + 10) = 4612;
1066        *(buf + 11) = 4616;
1067        *(buf + 12) = 1544;
1068        *(buf + 13) = 8;
1069        *(buf + 14) = 3076;
1070        *(buf + 15) = 0;
1071
1072 */
1073 }
1074
```

We claim:

1. A multicolor printing method employing a color printer capable of printing non-overlapping primary colorants and a black colorant, comprising the steps of:
   a) providing a digital color image having n-bit/color pixels;
   b) dividing the digital image into a plurality of pixel blocks;
   c) identifying pure primary colorant pixels and black and white pixels in each block and assigning such pixels to be printed with the corresponding colorant or white (no colorant);
   d) calculating a percent primary colorant, and black and white for remaining pixels in each block;
   e) using the calculated percentages, assigning the remaining pixels in each block to be printed with pure primary colorant or black or white according to a predetermined filling procedure; and
   f) printing the image using the assigned colorants.

2. The printing method as claimed in claim 1 wherein the primary colorants are red, green, and blue.

3. The printing method claimed in claim 2, wherein the predetermined filling procedure comprises filling the block in a spiral pattern, skipping the previously assigned pixels.

4. The printing method as claimed in claim 3 wherein the spiral pattern is filled by the steps of: filling in the white pixels first starting at an outer edge of the block; filling in the red, green, and blue pixels; and filling in the black pixels last.

5. The printing method claimed in claim 1, wherein the predetermined filling procedure comprises filling the block in a predetermined pattern, skipping the previously assigned pixels.

6. The printing method claimed in claim 2, wherein the steps of calculating percentages and assigning remaining pixels comprises the steps of:
   a) identifying a representative remaining pixel, including its red, green, and blue components;
   b) determining a black component in the representative pixel by subtracting the largest red, green, or blue component from a maximum possible pixel value;
   c) determining a white component in the representative pixel by selecting the smallest red, green or blue component;
   d) removing the white component from the red, green and blue components;
   e) calculating the percentage of red, green, blue, black and white in the representative pixel; and
   f) assigning pure color pixel counts to the remaining pixels by multiplying the calculated percentages by the remaining pixel count.

7. The printing method claimed in claim 6, wherein the step of identifying a representative remaining pixel comprises the step of:
   a) summing the red, green and blue values of the remaining pixels and dividing the sums by the number of remaining pixels.

8. A computer program product, comprising:
   a) a computer readable storage medium, such as a memory device, compact disc or a floppy disc, and
   b) a computer program stored on the disc for receiving a digital color image having n-bit color pixels and causing a computer connected to a color printer capable of non-overlapping color printing using non-overlapping primary colorants and a black colorant to print a color image using assigned colorants by performing the steps of:
      a) dividing the digital image into a plurality of pixel blocks;
      b) identifying pure primary colorant pixels and black and white pixels in each block and assigning such pixels to be printed with the corresponding colorant or white (no colorant);
      c) calculating a percent primary colorant and black and white for remaining pixels in each block; and
      d) using the calculated percentages, assigning the remaining pixels in each block to be printed with pure primary colorant or black or white according to a predetermined filling procedure.

9. The computer program product as claimed in claim 8 wherein the primary colorants are red, green, and blue.

10. The computer program product as claimed in claim 9 wherein the steps of calculating percentages and assigning remaining pixels comprises the steps of:
    a) identifying a representative remaining pixel, including its red, green, and blue components;
    b) determining a black component in the representative pixel by subtracting the largest red, green, or blue component from a maximum possible pixel value;
    c) determining a white component in the representative pixel by selecting the smallest red, green or blue component;
    d) removing the white component from the red, green and blue components;
    e) calculating the percentage of red, green, blue, black and white in the representative pixel; and
    f) assigning pure color pixel counts to the remaining pixels by multiplying the calculated percentages by the remaining pixel count.

11. The computer program product as claimed in claim 10 wherein the step of identifying a representative remaining pixel comprises the step of:
    a) summing the red, green and blue values of the remaining pixels and dividing the sums by the number of remaining pixels.

12. A color printer capable of printing non-overlapping primary colorants and a black colorant based on a digital color image having n-bit/color pixels, said printer comprising:
    a) means for dividing the digital image into a plurality of pixel blocks;
    b) means for identifying pure primary colorant pixels and black and white pixels in each block and assigning such pixels to be printed with the corresponding colorant or white (no colorant);
    c) means for calculating a percent primary colorant and black and white for remaining pixels in each block;
    d) means responsive to the calculated percentages for assigning the remaining pixels in each block to be printed with pure primary colorant or black or white according to a predetermined filling procedure; and
    e) means for printing the image using the assigned colorants.

13. A color printer as claimed in claim 12 wherein the primary colorants are red, green, and blue.

14. A color printer as claimed in claim 13 wherein said calculating means and said assigning means comprises a) means for identifying a representative remaining pixel, including its red, green, and blue components;

b) means for determining a black component in the representative pixel by subtracting the largest red, green, or blue component from a maximum possible pixel value;

c) means for determining a white component in the representative pixel by selecting the smallest red, green or blue component;

d) means for removing the white component from the red, green and blue components;

e) means for calculating the percentage of red, green, blue, black and white in the representative pixel; and f) means for assigning pure color pixel counts to the remaining pixels by multiplying the calculated percentages by the remaining pixel count.

15. A color printer as claimed in claim 14 wherein said means for identifying a representative remaining pixel comprises summing the red, green and blue values of the remaining pixels and dividing the sums by the number of remaining pixels.

* * * * *